United States Patent
Urano et al.

(10) Patent No.: US 9,954,216 B2
(45) Date of Patent: Apr. 24, 2018

(54) RECTANGULAR SECONDARY BATTERY

(71) Applicant: HITACHI AUTOMOTIVE SYSTEMS, LTD., Ibaraki (JP)

(72) Inventors: Kazuaki Urano, Hitachinaka (JP);
Keisuke Sawada, Hitachinaka (JP);
Takuro Tsunaki, Hitachinaka (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 74 days.

(21) Appl. No.: 15/038,551

(22) PCT Filed: Dec. 25, 2013

(86) PCT No.: PCT/JP2013/084565
§ 371 (c)(1),
(2) Date: May 23, 2016

(87) PCT Pub. No.: WO2015/097770
PCT Pub. Date: Jul. 2, 2015

(65) Prior Publication Data
US 2016/0301061 A1    Oct. 13, 2016

(51) Int. Cl.
*H01M 2/34* (2006.01)
*H01M 2/02* (2006.01)
(Continued)

(52) U.S. Cl.
CPC ......... *H01M 2/345* (2013.01); *H01M 2/0217* (2013.01); *H01M 2/263* (2013.01); *H01M 2/30* (2013.01); *H01M 2/305* (2013.01); *H01M 10/0431* (2013.01); *H01M 10/052* (2013.01); *H01M 10/0587* (2013.01); *H01M 2200/20* (2013.01); *H01M 2220/20* (2013.01)

(58) Field of Classification Search
CPC .................................................... H01M 2/345
See application file for complete search history.

(56) References Cited

U.S. PATENT DOCUMENTS 6,376,120 B1    4/2002 Azema
8,435,659 B2    5/2013 Byun et al.
(Continued)

FOREIGN PATENT DOCUMENTS

JP    07-326337 A    12/1995
JP    2008-066254 A    3/2008
(Continued)

OTHER PUBLICATIONS

Extended European Search Report for European Patent Application No. 13900091.3 dated Jul. 19, 2017.

*Primary Examiner* — Jonathan Crepeau
(74) *Attorney, Agent, or Firm* — Volpe and Koenig, P.C.

(57) ABSTRACT

A rectangular secondary battery (1) includes a current interrupting portion (60) disposed in a current path between a collector plate (21) connected to a rolled electrode group (40) and an external terminal (61) and configured to interrupt the current path when an internal pressure of a battery container (2) is increased. The current interrupting portion (60) has a diaphragm (68) whose top portion (68a) is electrically connected to the collector plate (21) and whose edge portion (68b) is electrically connected to the external terminal (61). The diaphragm (68) is formed into a convex shape protruding inside the battery container (2) and into a planar shape elongated in a longitudinal direction of the battery container (2).

6 Claims, 11 Drawing Sheets

(51) Int. Cl.
*H01M 2/30*    (2006.01)
*H01M 10/04*   (2006.01)
*H01M 2/26*    (2006.01)
H01M 10/052    (2010.01)
H01M 10/0587   (2010.01)

(56)    References Cited

U.S. PATENT DOCUMENTS

| | | |
|---|---|---|
| 2008/0038627 A1 | 2/2008 | Yamauchi et al. |
| 2010/0167116 A1 | 7/2010 | Okada |
| 2010/0323234 A1 | 12/2010 | Kim et al. |
| 2013/0189552 A1 | 7/2013 | Okada |
| 2013/0196191 A1 | 8/2013 | Arai et al. |
| 2014/0355389 A1 | 12/2014 | Reunamaki et al. |
| 2015/0171411 A1 | 6/2015 | Kobayashi et al. |

FOREIGN PATENT DOCUMENTS

| | | |
|---|---|---|
| JP | 2010-157451 A | 7/2010 |
| JP | 2012-119183 A | 6/2012 |
| WO | 2013093987 A1 | 6/2013 |
| WO | 2013164897 A1 | 7/2013 |

RECTANGULAR SECONDARY BATTERY

TECHNICAL FIELD

The present invention relates to a rectangular secondary battery for vehicle or the like.

BACKGROUND ART

Conventionally, in the field of rechargeable secondary batteries, aqueous system batteries such as a lead battery, a nickel-cadmium battery, and a nickel-hydrogen battery were mainstream. However, along with reduction in size and weight of electrical devices, a lithium-ion secondary battery having a high energy density has begun to attract attention, and study, development, and commercialization thereof are now advanced rapidly. Further, under circumstances where global warming or exhaustion of resources come to light, an electric vehicle (EV) and a hybrid electric vehicle (HEV) having a mechanism where a driving force is partially assisted by an electric motor are developed by automobile manufacturers, and a secondary battery having large capacity and high output is required as a power supply for the EV and HEV.

As a power supply matching such requirements, a high voltage lithium-ion secondary battery of a non-aqueous system is now attracting attention. In particular, a rectangular lithium-ion secondary battery having a battery container with a flat-box shape has high volumetric efficiency when being packed and is thus increasingly demanded as a power supply to be mounted in the HEV, EV, or other equipment. In the rectangular secondary battery having such a sealed type battery container, a pressure inside the battery container may be increased due to, for example, overcharge, excessive temperature rise, or breakage by an external force.

There is known a non-aqueous electrolyte secondary battery provided with a current interrupting mechanism of interrupting current in the above case (see, for example, PTL 1). A non-aqueous electrolyte secondary battery described in PTL 1 has a fragile portion that is ruptured when a pressure inside an exterior can is increased to thereby interrupt electrical conduction. The fragile portion is connected, at its center portion, to a surface of a diaphragm that faces inside the battery, and a peripheral portion thereof is connected to a collector tab positioned below the diaphragm. When the diaphragm is deformed to be lifted up, the fragile portion is ruptured to interrupt electrical conduction to the diaphragm.

CITATION LIST

Patent Literature

PTL 1: JP 2008-66254 A

SUMMARY OF INVENTION

Technical Problem

In the non-aqueous electrolyte secondary battery described in PTL 1, the diaphragm is disposed on a surface of a tab receiving portion that faces outside the battery so as to cover a holder hole, and furthermore, its central bottom surface is adhered to be electrically conductive to the fragile portion through the holder hole. Thus, a gas pressure in the battery is applied to the surfaces of the fragile portion and diaphragm that face inside the battery. With this structure, there is provided a non-aqueous electrolyte secondary battery having a current interrupting mechanism excellent in impact resistance and vibration resistance.

In the non-aqueous electrolyte secondary battery described in PTL 1, the circular flat diaphragm needs to be deformed toward outside the battery so as to rupture the fragile portion. However, it is difficult to deform the circular flat diaphragm in a limited space between the diaphragm and a sealing body lead that penetrates a sealing plate to apply a high stress to the fragile portion. Therefore, strength of the fragile portion needs to be reduced, and in the worst case, the fragile portion may be ruptured by vibration or impact applied thereto to induce malfunction of the current interrupting mechanism.

The present invention has been made in view of the above problem, and an object thereof is to provide a rectangular secondary battery which is excellent in vibration resistance and impact resistance and capable of reliably and stably interrupting a current path when a pressure inside a battery container is increased.

Solution to Problem

To attain the above object, a rectangular secondary battery according to the present invention includes a current interrupting portion disposed in a current path between a collector plate connected to a rolled electrode group and an external terminal and configured to interrupt the current path when an internal pressure of a battery container is increased. The current interrupting portion has a diaphragm whose top portion is electrically connected to the collector plate and whose edge portion is electrically connected to the external terminal. The diaphragm is formed into a convex shape protruding inside the battery container and into a planar shape elongated in a longitudinal direction of the battery container.

Advantageous Effects of Invention

According to the present invention, the diaphragm is formed into a convex shape protruding inside the battery container and into a planar shape elongated in a longitudinal direction of the battery container, so that it is possible not only to increase strength of the diaphragm against the internal pressure of the battery container but also to increase a surface area of the diaphragm to which the internal pressure of the battery container is applied. Thus, when the internal pressure of the battery container reaches a predetermined value to deform the top portion of the diaphragm into a concave shape, the current path between the external terminal and collector plate can be mechanically interrupted with a comparatively large force. As a result, mechanical strength of the current path can be increased to thereby prevent the current path from being damaged or ruptured by an external factor other than the internal pressure, such as vibration or impact. Thus, there can be provided a rectangular secondary battery more excellent in vibration resistance and impact resistance than a conventional one and capable of stably and reliably interrupting the current path upon increase in the internal pressure of the battery container.

Other problems, configurations, and effects will be clarified in the description of the following embodiments.

DESCRIPTION OF EMBODIMENTS

An embodiment of a rectangular secondary battery according to the present invention will be described in detail below with reference to the drawings.

Figure 1:
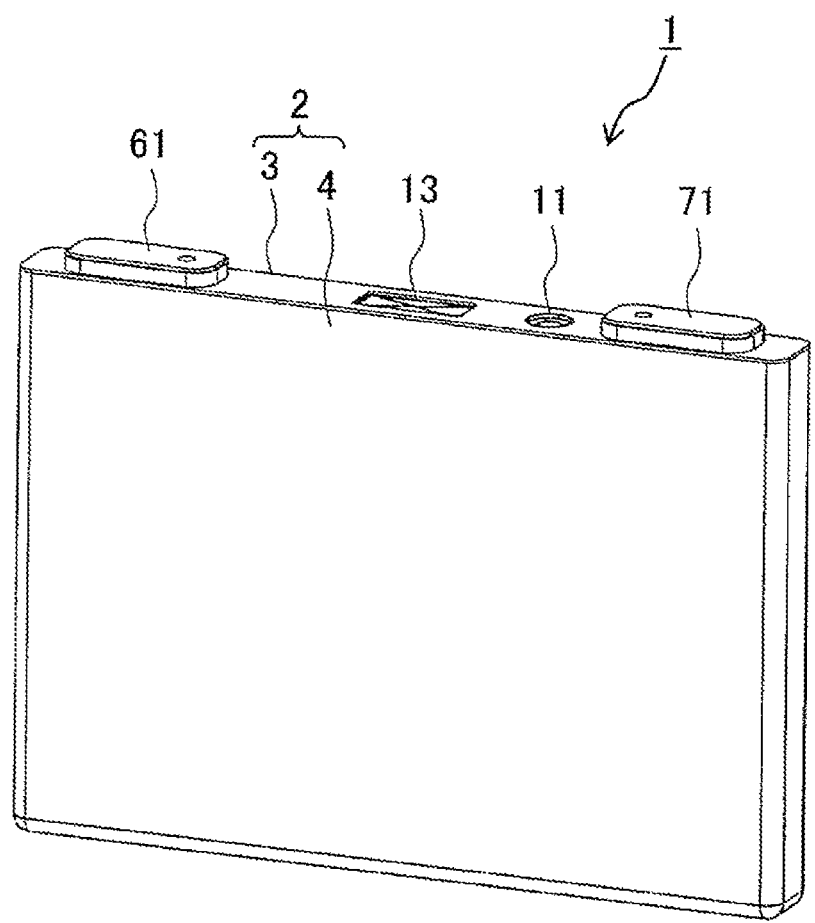
FIG. 1 is a perspective view of a rectangular secondary battery according to a first embodiment of the present invention.
Figure 2:
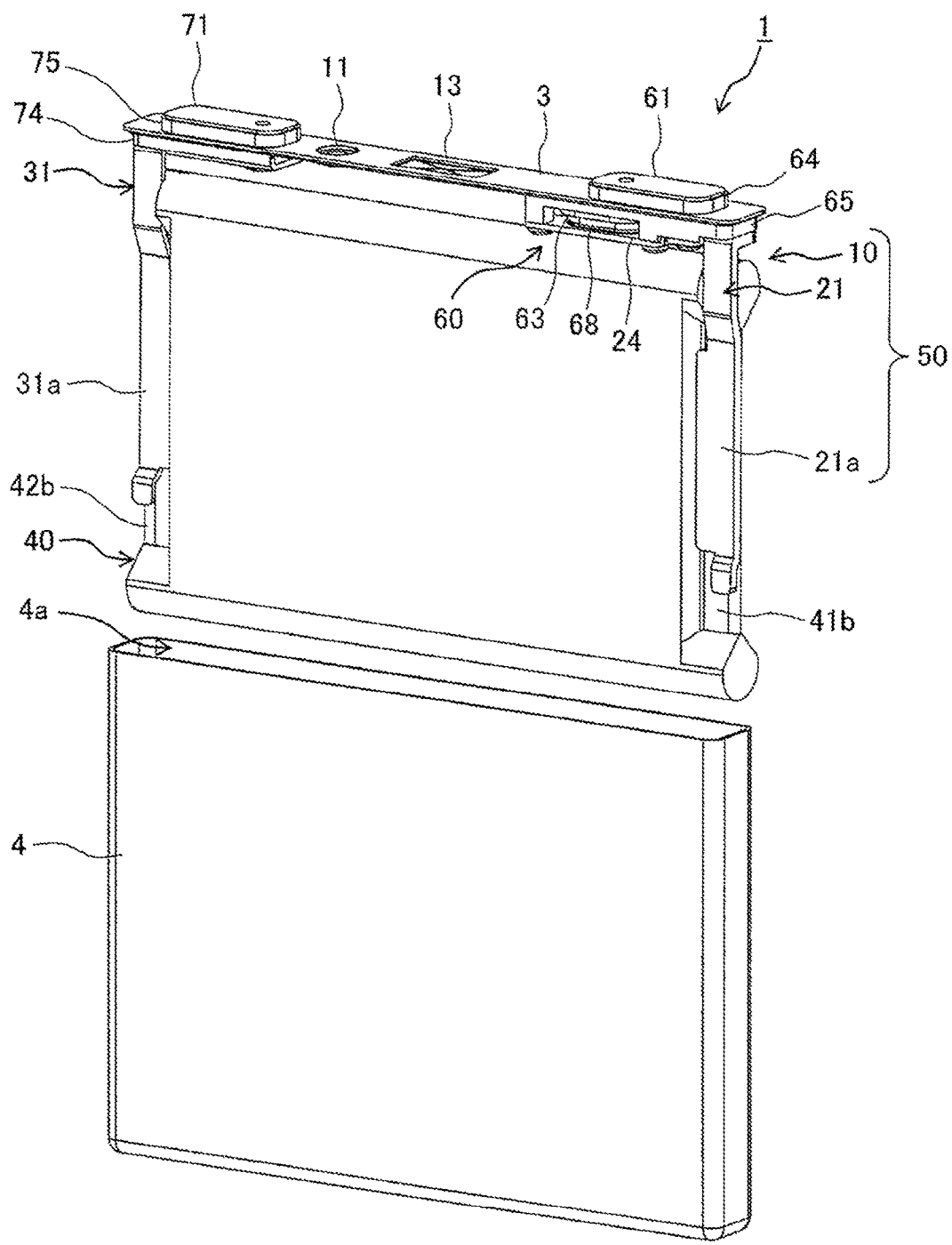
FIG. 2 is an exploded perspective view of the rectangular secondary battery illustrated in FIG. 1.
Figure 3:
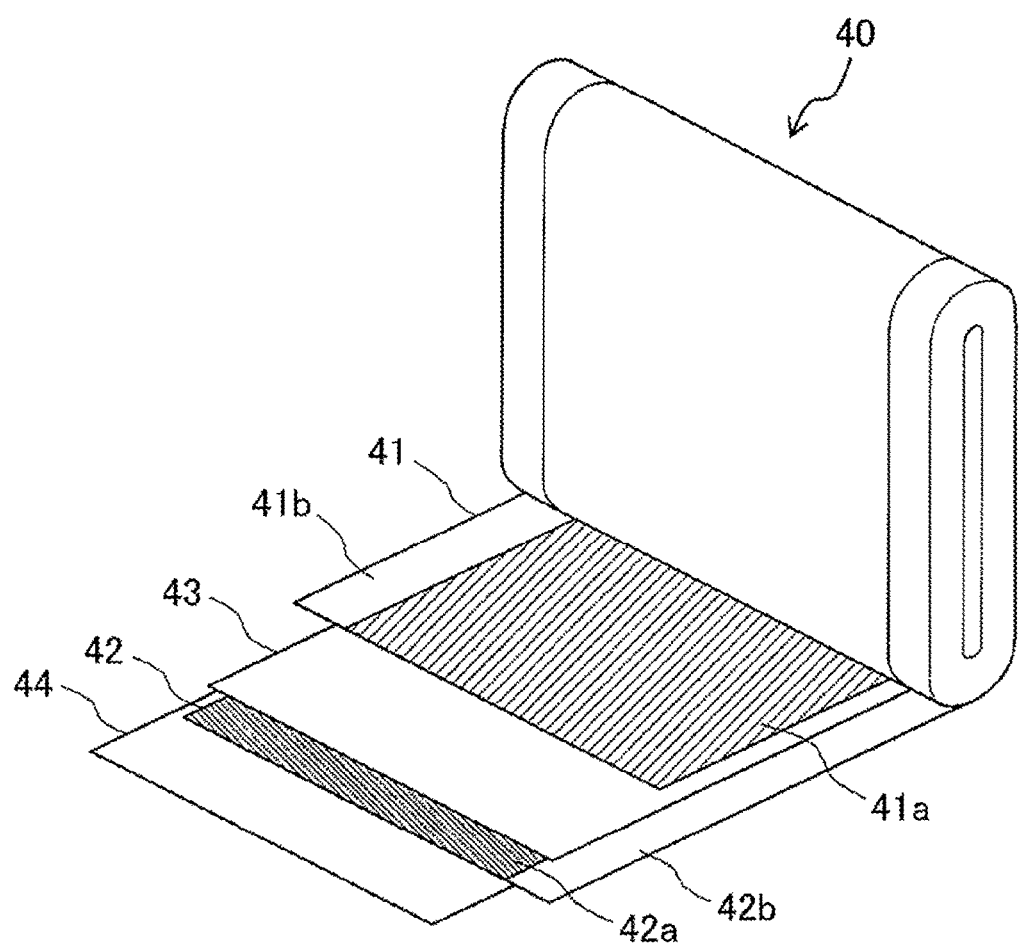
FIG. 3 is an exploded perspective view of a rolled electrode group that the rectangular secondary battery illustrated in FIG. 1 has.

FIG. 1 is a perspective view of a rectangular secondary battery 1 according to an embodiment of the present invention. FIG. 2 is an exploded perspective view of the rectangular secondary battery 1 illustrated in FIG. 1. FIG. 3 is an exploded perspective view in which a rolled electrode group 40 illustrated in FIG. 2 is partially unrolled.

The rectangular secondary battery 1 is, for example, a lithium-ion secondary battery and has a flat rectangular battery container 2. The battery container 2 is constituted by a rectangular box shaped battery can 4 having an opening portion 4a and a battery lid 3 that closes the opening portion 4a of the battery can 4. Hereinafter, a direction along a long side of the battery lid 3 having a rectangular shape in a plan view is referred to as a longitudinal direction of the battery container 2, and a direction along a short side thereof is referred to as a short direction. The battery can 4 and battery lid 3 are each produced by using, for example, aluminum or an aluminum alloy. The battery lid 3 is joined to the battery can 4 by, for example, laser welding over the entire periphery of the opening portion of the battery can 4, whereby the battery container 2 is sealed. A rolled electrode group 40 is housed inside the battery container 2 through a not illustrated insulating sheet.

As illustrated in FIG. 3, the rolled electrode group 40 is composed of a rolled laminated body including a positive electrode 41 and a negative electrode 42, which are laminated with separators 43 and 44 interposed therebetween, and is formed into a flat shape. To obtain the rolled electrode group 40, a stripe-shaped laminated body is rolled with a tension load of, for example, about 10 N applied in an extending direction thereof. At this time, the laminated body of the rolled electrode group 40 is rolled while being subjected to meandering control such that both end portions of the respective positive electrode 41, negative electrode 42, and separators 43, 44 in a width direction of the stripe-shaped laminated body, i.e., in a roll axis direction of the stripe-shaped laminated body are situated at fixed positions.

The positive electrode 41 has a positive electrode mixture layer 41a formed on both surfaces of a positive electrode foil and has, at one side edge thereof in the width direction of the rolled electrode group 40, i.e., in the roll axis direction of the rolled electrode group 40, a foil exposed b where the positive electrode foil is exposed. The negative electrode 42 has a negative electrode mixture layer 42a formed on both surfaces of a negative electrode foil and has, at the other side edge thereof in the width direction of the rolled electrode group 40, i.e., in the roll axis direction of the rolled electrode group 40, a foil exposed portion 42b where the negative electrode foil is exposed. The foil exposed portions 41b and 42b of the respective positive and negative electrodes 41 and 42 are situated at mutually opposite positions in the width direction, i.e., in the roll axis direction.

The positive electrode 41 can be produced, for example, in the following procedure. First, 10 parts by weight of scale-like graphite as a conductive material and 10 parts by weight of polyvinylidene fluoride (hereinafter, referred to as PVDF) as a binder are added to 100 parts by weight of lithium manganate (chemical formula: $LiMn_2O_4$) as a positive electrode active material, followed by addition of N-methyl-pyrrolidone (hereinafter, referred to as NMP) as a dispersing solvent. Then, kneading is performed to thereby produce a positive electrode mixture. The produced positive electrode mixture is applied to both surfaces of an aluminum foil (positive electrode foil) of a thickness of 20 μm except for the foil exposed portion 41b. Thereafter, drying, pressing, and cutting are performed, whereby the positive electrode 41 in which a thickness of the positive electrode mixture layer 41a not including the aluminum foil is, for example, 90 μm can be obtained.

Although the lithium manganate is used as the positive electrode active material in the present embodiment, the positive electrode active material may be another lithium manganate having a spinel crystal structure, a lithium manganese complex oxide partially substituted by or doped with a metallic element, lithium cobaltate having a laminar crystal structure, lithium titanate, or a lithium-metal composite oxide obtained by substitution or doping of some of these substances with metallic elements.

The negative electrode 42 can be produced, for example, in the following procedure. First, 10 parts by weight of PVDF as a binder is added to 100 parts by weight of amorphous carbon powder as a negative electrode active material, followed by addition of NMP as a dispersing solvent. Then, kneading is performed to thereby produce a negative electrode mixture. The produced negative electrode mixture is applied to both surfaces of a copper foil (negative electrode foil) of a thickness of 10 μm except for the foil exposed portion 42b. Thereafter, drying, pressing, and cutting are performed, whereby the negative electrode 42 in which a thickness of the negative electrode mixture layer 42a not including the copper foil is, for example, 70 μm can be obtained.

Although the amorphous carbon is used as the negative electrode active material in the present embodiment, the negative electrode active material is not particularly limited and may be natural graphite allowing insertion and desorption of lithium ions, various artificial graphite materials, carbonaceous materials such as coke, or the like. Further, the form of particles of the negative electrode active material is not particularly limited and may be scaly, spherical, fibrous, and massive forms.

Further, although the PVDF is used as the binder in the present embodiment, the binder may be polytetrafluoroethylene (PTFE), polyethylene, polystyrene, polybutadiene, butyl rubber, nitrile rubber, styrene-butadiene rubber, polysulfide rubber, nitrocellulose, cyanoethyl cellulose, various latexes, acrylonitrile, vinyl fluoride, vinylidene fluoride, propylene fluoride, chloroprene fluoride, a polymer such as an acrylic resin, and a mixture of these substances.

The separators 43 and 44 are each formed of a polyethylene insulating material having a microporous property and each have a role of insulating the positive and negative electrodes 41 and 42 from each other. The negative electrode mixture layer 42b of the negative electrode 42 is larger in size than the positive electrode mixture layer 41a of the positive electrode 41 in the width direction and, therefore, the positive electrode mixture layer 41a is completely sandwiched between the negative electrode mixture layers 42a without fail.

The foil exposed portions 41b and 42b of the respective positive and negative electrodes 41 and 42 are bundled at a flat part of the rolled electrode group 40. As illustrated in FIG. 2, the foil exposed portions 41b and 42b are joined and fixed to joint pieces 21a and 31a of flat collector plates 21 and 31, respectively, which extend from a lower portion of the battery lid 3 to a bottom surface of the battery can 4 in a height direction of the battery container 2, by, for example, resistance welding or ultrasonic welding. As a result, in the rolled electrode group 40, the positive and negative electrodes 41 and 42 are electrically connected to the positive- and negative-electrode collector plates 21 and 31, respectively. Widths of the separators 43 and 44 alternately laminated with the positive and negative electrodes 41 and 42 are larger than that of the negative electrode mixture layer 42a but not large enough to completely cover the foil exposed portions 41b and 42b, allowing the foil exposed portions 41b and 42b to be exposed from opposite sides of the respective separators 43 and 44. Thus, the width sizes of the separators 43 and 44 do not interfere with bundling and welding of the foil exposed portions 41b and 42b.

The positive electrode collector plate 21 is fixed to a lower surface of the battery lid 3 through an insulating member 65 and is disposed inside the battery container 2. A positive electrode external terminal 61 is fixed to an upper surface of the battery lid 3 through an insulating member 64 and is disposed outside the battery container 2. Although details will be described later, a current interrupting portion 60 is provided in a current path between the positive electrode collector plate 21 and positive electrode external terminal 61. When an internal pressure of the battery container 2 is increased to a predetermined value, the current interrupting portion 60 interrupts the current path between the positive electrode collector plate 21 and positive electrode external terminal 61 by using the increase in the internal pressure.

The negative electrode collector plate 31 is fixed to the lower surface of the battery lid 3 through an insulating member 74 and is disposed inside the battery container 2. A negative electrode external terminal 71 is fixed to the upper surface of the battery lid 3 through an insulating member 75 and is disposed outside the battery container 2. Although not illustrated, the negative electrode collector plate 31 and negative electrode external terminal 71 are caulked by a connection terminal penetrating the battery lid 3 and are electrically connected to each other through the connection terminal. The negative electrode collector plate 31 and negative electrode external terminal 71 are each produced by using, for example, copper or a copper alloy.

The positive- and negative-electrode external terminals 61, 71 and positive- and negative electrode collector plates 21, 31 are fixed to the battery lid 3 to thereby form a lid assembly 10. Further, the foil exposed portions 41b and 42b of the rolled electrode group 40 are joined and fixed to the joint pieces 21a and 31a, respectively, and the rolled electrode group 40 is supported between the positive- and negative-electrode collector plates 21 and 31, whereby a power generating element 50 is formed.

The battery lid 3 has, between the positive- and negative-electrode external terminals 61 and 71 which are fixed to one and the other ends thereof in the longitudinal direction, an injection hole 11 for injecting an electrolyte solution and a gas exhaust valve 13 which is opened when the pressure inside the battery container 2 is increased to exceed a predetermined value. A non-aqueous electrolyte solution is injected inside the battery container 2 through the injection hole 11 of the battery lid 3, and then an injection plug is joined to the injection hole 11 by, for example, laser welding, whereby the battery container 2 is sealed.

The non-aqueous electrolyte solution to be injected into the battery container 2 may be lithium hexafluorophosphate ($LiPF_6$) dissolved at concentration of 1 mol/l in a mixed solution obtained by mixing ethylene carbonate with dimethyl carbonate at a volume ratio of 1:2. The non-aqueous electrolyte solution is not limited by a specific lithium salt or a specific organic solvent. For example, a non-aqueous electrolyte solution obtained by dissolving a common lithium salt as an electrolyte into an organic solvent may be used.

The electrolyte may be, for example, $LiClO_4$, $LiAsF_6$, $LiBF_4$, $LiB(C_6H_5)_4$, $CH_3SO_3Li$, $CF_3SO_3Li$, or a mixture of these substances. The organic solvent may be propylene carbonate, ethylene carbonate, 1,2-dimethoxyethane, 1,2-diethoxyethane, γ-butyrolactone, tetrahydrofuran, 1,3-dioxolane, 4-methyl-1,3-dioxolane, diethyl ether, sulfolane, methylsulfolane, acetonitrile, propionitrile, or a mixed solvent containing at least two of these substances, and a mixing ratio thereof is not particularly limited.

(Current Interrupting Portion)

Figure 4A:
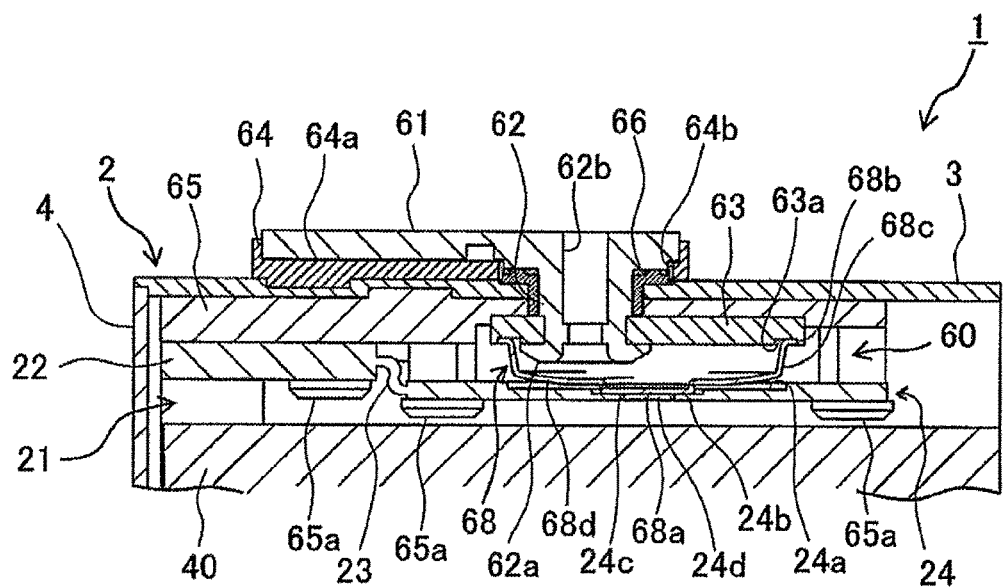
FIG. 4A is an enlarged cross-sectional view of a current interrupting portion that the rectangular secondary battery illustrated in FIG. 1 has.
Figure 4B:
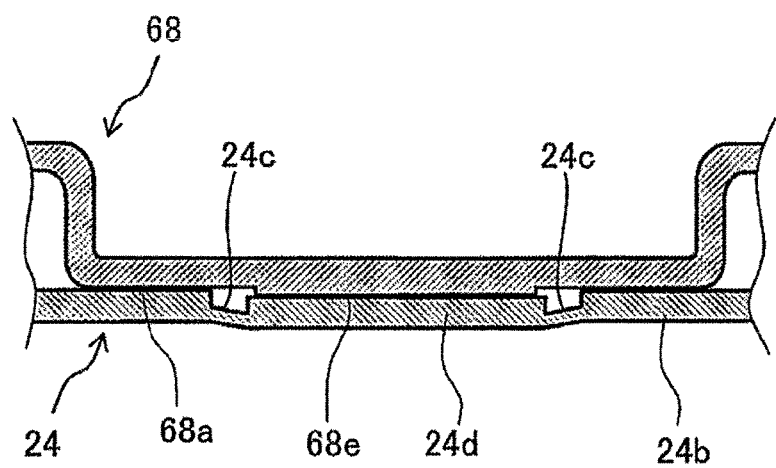
FIG. 4B is an enlarged cross-sectional view of a joint portion illustrated in FIG. 4A.
Figure 5:
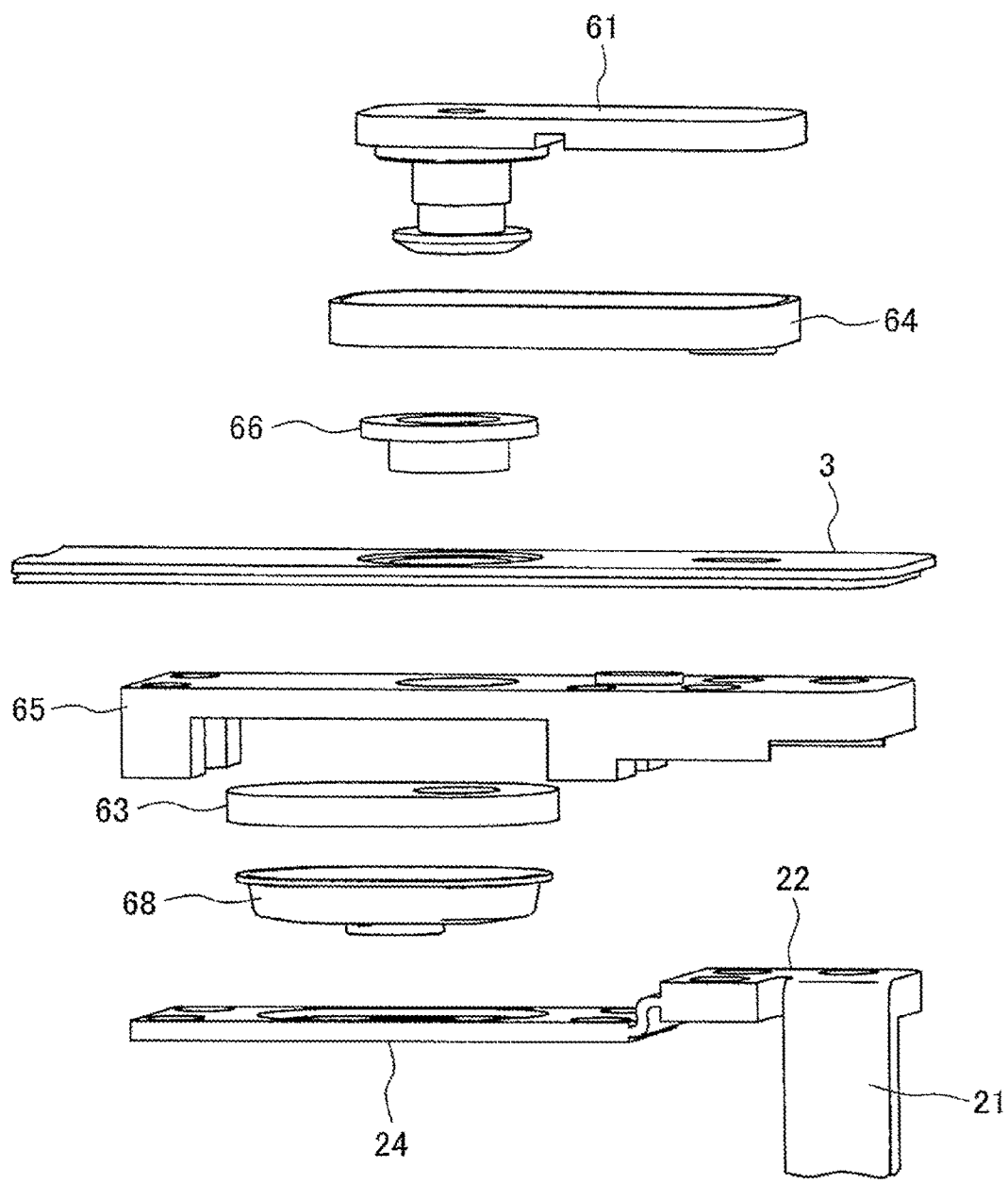
FIG. 5 is an exploded perspective view of a diaphragm illustrated in FIGS. 4A and 4B and members therearound.

FIG. 4A is a cross-sectional view taken along the longitudinal direction of the battery container 2 of the rectangular secondary battery 1 illustrated in FIG. 1, which illustrates, in an enlarged manner, the current interrupting portion 60 and a portion therearound. FIG. 4B is an enlarged cross-sectional view of a joint portion 24d illustrated in FIG. 4A. FIG. 5 is an exploded perspective view of members illustrated in FIG. 4A.

The current interrupting portion 60 of the present embodiment mainly includes a cleavage plate 24 and a diaphragm 68, which are to be described below. Hereinafter, a configuration of the current interrupting portion 60 will be described in detail.

As described above, the positive electrode collector plate 21 connected to foil exposed portion 41b of the positive electrode 41 of the rolled electrode group 40 is fixed to the lower surface of the battery lid 3 through the insulating member 65 and is disposed inside the battery container 2. The positive electrode collector plate 21 has a fixing hole in a flat base portion 22 opposite to the lower surface of the battery lid 3. The insulating member 65 is produced by using a resin material having an insulating property and has fixation convex portions 65a to be inserted into the fixing hole of the base portion 22 of the positive electrode collector plate 21. The fixation convex portions 65a of the insulating member 65 are each inserted into the fixing hole of the base portion 22, followed by heat welding, whereby the positive electrode collector plate 21 is fixed to the insulating member 65. The cleavage plate 24 is connected to one end of the base portion 22 of the positive electrode collector plate 21. The cleavage plate 24 can be regarded as a part of the positive electrode collector plate 21.

The cleavage plate 24 is integrally formed with the positive electrode collector plate 21 and is connected to the base portion 22 of the positive electrode collector plate 21 through a connecting portion 23 bent in an S-shape. The cleavage plate 24 is a flat member extending in the longitudinal direction of the battery container 2 and having a rectangular shape in a plan view. The cleavage plate 24 is disposed such that a surface thereof that faces outside the battery container 2 is situated one step lower (toward the inside of the battery container 2) than a surface of the base portion 22 of the collector plate 21 that faces outside the battery container 2 and at the same height position as a surface of the base portion 22 of the collector plate 21 that faces inside the battery container 2. This provides a step formed between the cleavage plate 24 and base portion 22 of the collector plate 21 in a direction perpendicular to the battery lid 3.

A stepwise concave portion 24a is formed in the surface of the cleavage plate 24 that faces outside the battery container 2, and a thin portion 24b is formed in a center portion of the concave portion 24a. The cleavage plate 24 has, in the thin portion 24b, a joint portion 24d to be joined with a protrusion 68a of the diaphragm 68 and an annular groove 24c formed around the joint portion 24d.

Figure 6:
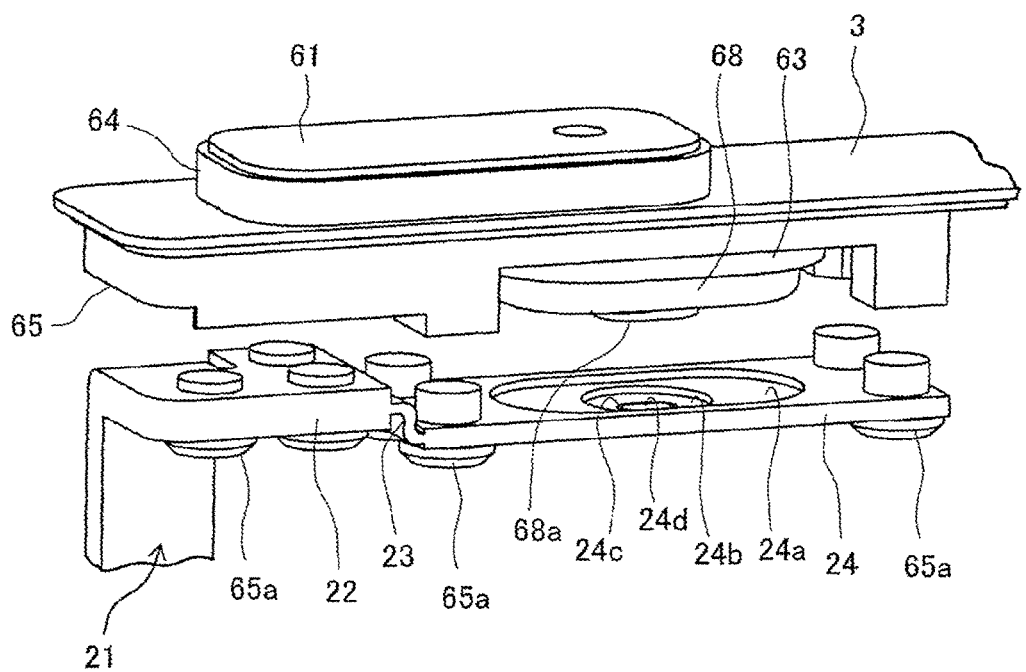
FIG. 6 is an exploded perspective view obtained by cutting an insulating member illustrated in FIG. 2 and illustrating a joint portion of a cleavage plate.

FIG. 6 is an exploded perspective view obtained by cutting the insulating member 65 illustrated in FIG. 2 and illustrating the thin portion 24b of the cleavage plate 24.

The thin portion 24b is a portion recessed into a stepped shape inside the concave portion 24a, which is formed by reducing a thickness of the cleavage plate 24 to a value less than a thickness of the concave portion 24a. The concave portion 24a and thin portion 24b are thus formed, whereby two steps are formed in the surface of the cleavage plate 24 that faces outside the battery container 2 in a thickness direction perpendicular to the battery lid 3; on the other hand, the surface of the cleavage plate 24 that faces inside the battery container 2 is flattened. The annular groove 24c is formed in a center portion of the thin portion 24b.

Figure 7A:
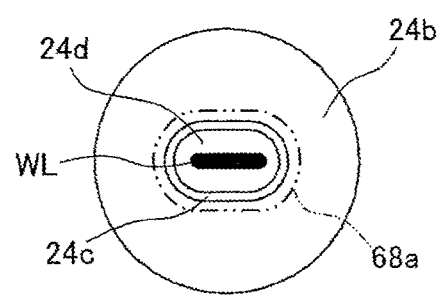
FIG. 7A is an enlarged plan view of a joint portion of the cleavage plate illustrated in FIG. 6.

FIG. 7A is an enlarged plan view illustrating the annular groove 24c and joint portion 24d which are illustrated in FIG. 6 as viewed in a direction perpendicular to the upper surface of the battery lid 3.

The annular groove 24c is a groove-like portion formed in the thin portion 24b so as to be recessed in a thickness direction of the thin portion 24b. The thin portion 24b has the smallest thickness at a portion where the annular groove 24c is formed. The annular groove 24c is formed into an annular shape elongated in the longitudinal direction of the battery container 2 in a plan view. A portion surrounded by the annular groove 24c serves as the joint portion 24d to be joined to the protrusion 68a of the diaphragm 68. As illustrated in FIG. 7A, the annular groove 24c can be formed into an elongated circle having a linear portion extending in the longitudinal direction of the battery container 2, a race track shape, or an ellipse in a plan view.

Figure 7B:
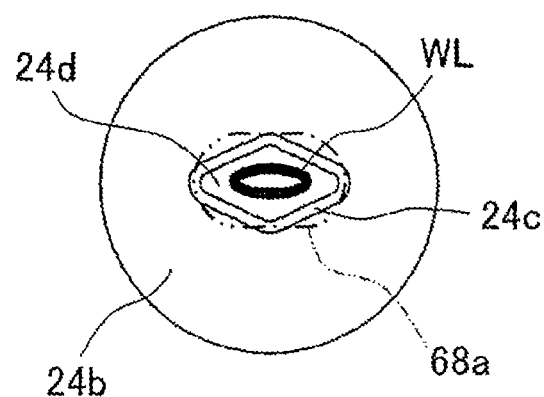
FIG. 7B is an enlarged plan view of a first modification of the joint portion illustrated in FIG. 7A.
Figure 7C:
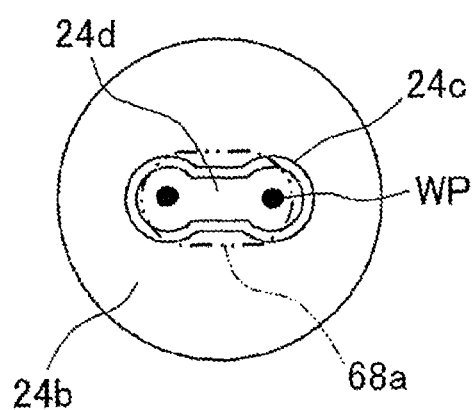
FIG. 7C is an enlarged plan view of a second modification of the joint portion illustrated in FIG. 7A.

The planar shape of the annular groove 24c is not limited to the shape illustrated in FIG. 7A. FIGS. 7B and 7C are enlarged plan views each illustrating a modification of the planar shape of the annular groove 24c illustrated in FIG. 7A.

In the example illustrated in FIG. 7B, the planar shape of the annular groove 24c is rectangular or rhombic. A dimension of the annular groove 24c in the short direction of the battery container 2 is smaller than that in the longitudinal direction of the battery container 2, and thus the annular groove 24c is formed into an annular shape elongated in the longitudinal direction of the battery container 2 in a plan view. Both ends of the annular groove 24c in the longitudinal direction of the battery container 2 are each formed into a circular arc shape. In the example illustrated in FIG. 7C, the annular groove 24c is also formed into an annular shape elongated in the longitudinal direction of the battery container 2 in a plan view. More specifically, in this example, the annular groove 24c is formed into an iron-dumbbell shape in a plan view having a circular arc shape portion at both ends thereof in the longitudinal direction of the battery container 2 and a linear portion extending in the longitudinal direction of the battery container 2 between the circular arc shape portions.

When the annular groove 24c is formed into an annular shape elongated in the longitudinal direction of the battery container 2 as described above, a groove depth at a portion extending in the longitudinal direction of the battery container 2 is preferably greater than that at the other portion. For example, in the annular groove 24c illustrated in FIG. 7A, a groove depth at the linear portion extending in the longitudinal direction of the battery container 2 is preferably greater than that at the curved portion at both ends of the annular groove 24c. In the annular groove 24c illustrated in FIG. 7B, a groove depth at the linear portion of each side of the rectangle or rhomboid extending in the longitudinal direction of the battery container 2 is preferably greater than that at the circular arc shape portion at both ends of the annular groove 24c in the longitudinal direction of the battery container 2. In the annular groove 24c illustrated in FIG. 7C, a groove depth at the linear portion extending in the longitudinal direction of the battery container 2 is preferably greater than that at the circular arc shape portion at both ends of the annular groove 24c in the longitudinal direction of the battery container 2.

As illustrated in FIG. 4A, FIG. 5, and FIG. 6, the fixing holes are formed at both ends of the cleavage plate 24 in the longitudinal direction thereof, and the fixation convex portions 65a of the insulating member 65 are each inserted into and welded to the fixing hole of the cleavage plate 24, whereby both ends of the cleavage plate 24 is supported and fixed to the insulating member 65. As a result, the cleavage plate 24 is fixed to the insulating member 65 at a portion between the concave and thin portions 24a and 24b and the connecting portion 23. The concave portion 24a and thin portion 24b are formed between both ends of the cleavage plate 24 thus fixed to the insulating member 65 in the longitudinal direction thereof.

A diaphragm 68 having a convex shape protruding inside the battery container 2 is disposed in a space between the base portion 22 of the collector plate 21 and cleavage plate 24 which is formed one step lower than the base portion 22. A part of the diaphragm 68 is housed in the concave portion 24a of the cleavage plate 24, and a top portion of the diaphragm 68 is joined to the joint portion 24d of the thin portion 24b inside the concave portion 24a.

Figure 8A:
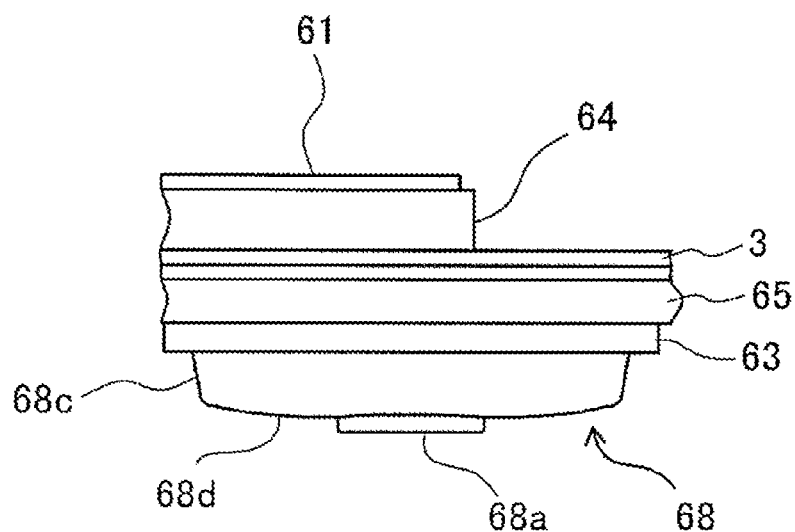
FIG. 8A is an enlarged side view of the diaphragm illustrated in FIG. 6.
Figure 8B:
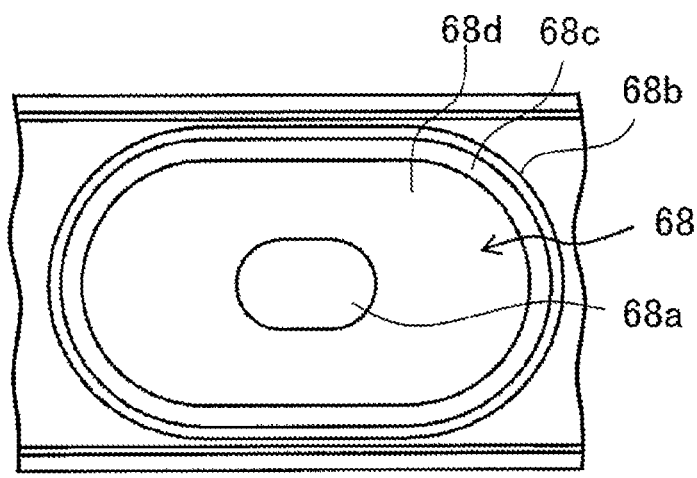
FIG. 8B is an enlarged bottom view of the diaphragm illustrated in FIG. 8A.

FIG. 8A is an enlarged side view of the diaphragm 68 illustrated in FIG. 6. FIG. 8B is an enlarged plan view of the diaphragm 68 illustrated in FIG. 8A as viewed in a direction perpendicular to a lower surface of the battery lid 3.

The diaphragm 68 has a bowl shape having a hollow inside and formed into a convex shape protruding inside the battery can 4. The diaphragm 68 includes a protrusion 68a, a ceiling portion 68d adjacent to the protrusion 68a, a side wall portion 68c adjacent to the ceiling portion 68d, and an edge portion 68b positioned at an end portion of the side wall portion 68c. The protrusion 68a, ceiling portion 68d, side wall portion 68c, and edge portion 68b are arranged in this order from the inside to outside of the battery container 2. The side wall portion 68c is an annular peripheral side wall rising from a surface of a conductive plate 63 extending parallel to the battery lid 3 that faces inside the battery can 4 toward the inside of the battery can 4. The ceiling portion 68d is a part of the diaphragm 68 adjacent to the protrusion 68a and has a curved surface protruding inside of the battery can 4.

An inclination of the ceiling portion 68d relative to a surface parallel to the battery lid 3 is gentler than that of the side wall portion 68c relative to the surface parallel to the battery lid 3. Although the side wall portion 68c is formed into a linear shape in the cross-sectional view of FIG. 4A, it may be formed into a curved shape protruding outward. In this case, a curvature of the side wall portion 68c may be made different from that of the ceiling portion 68d. For example, the curvature of the side wall portion 68c may be smaller than that of the ceiling portion 68d.

As illustrated in the plan view of FIG. 8B, the diaphragm 68 is formed into a race track shape having a linear portion in the longitudinal direction of the battery container 2 and elongated in the longitudinal direction of the battery container 2. A planar shape of the diaphragm 68 may be any shape such as an elongated circle having a linear portion in the short direction of the battery container 2, an elongated circle without a linear portion, an ellipse, or shapes defined by other closed curves, as long as the following conditions are met: an outer dimension of the diaphragm 68 in the longitudinal direction of the battery container is larger than that in the short direction of the battery container; and the diaphragm 68 has a shape elongated in the longitudinal direction of the battery container 2. Preferably, the planar shape of the diaphragm 68 is a shape defined by an outwardly-protruding curve or a circular arc, and a portion extending in the short direction of the battery container 2 includes no linear portion.

The diaphragm 68 is joined to the joint portion 24d of the cleavage plate 24 connected to the base portion 22 of the positive electrode collector plate 21 at the protrusion 68a formed at the top portion of the convex shape thereof protruding inside the battery can 4. As illustrated in FIGS. 4A and 4B, the protrusion 68a is a portion protruding inside the battery container 2 from the top of the diaphragm 68 in a stepped shape. The protrusion 68a is a bottomed cylindrical portion having a hollow inside and constituted by a flat top surface and a peripheral side wall. As illustrated in the plan view of FIG. 8B, the protrusion 68a is formed into a shape corresponding to the shape of the diaphragm 68, i.e., a shape elongated in the longitudinal direction of the battery container 2, such as an elongated circle, a race track shape, or an ellipse.

As illustrated in FIG. 4B, the top surface of the protrusion 68a is brought into contact with the joint portion 24d surrounded by the annular groove 24c and thin portion 24b outside the joint portion 24d and joined to the joint portion 24d. In the example of FIG. 7A, the protrusion 68a can be made to contact with the thin portion 24b outside the annular groove 24c over the entire periphery of the annular groove 24c. In the example of FIG. 7B, the protrusion 68a can be made to contact with the thin portion 24b outside four sides of the annular groove 24c. In the example of FIG. 7C, the protrusion 68a can be made to contact with the thin portion 24b outside the linear portion of the annular groove 24c and can be made to contact with the joint portion 24d inside the circular arc portion of the annular groove 24c.

A stepped portion 68e abutting against the joint portion 24d is formed at the top surface of the protrusion 68a. The stepped portion 68e is a portion protruding inside the battery container 2 from the top surface of the protrusion 68a in a stepped shape. A height of a step between the stepped portion 68e and top surface of the protrusion 68a is set so as to cause the thin portion 24b to be slightly elastically deformed toward inside the battery container 2 in a state where the top surface of the protrusion 68a is brought into contact with the thin portion 24b outside the joint portion 24d to bring the joint portion 24d into close contact with the stepped portion 68e at a predetermined surface pressure. The height of a step between the stepped portion 68e and top surface of the protrusion 68a can be set to, for example, 100 μm or less. The stepped portion 68e may have any planar shape, as long as it does not protrude outside the annular groove 24c. For example, the planar shape of the stepped portion 68e may be a shape following the planar shape of the annular groove 24c or a shape corresponding to the planar shape of the joint portion 24d.

The stepped portion 68e at the top surface of the protrusion 68a is joined to the joint portion 24d by, for example, laser welding, resistance welding, or ultrasonic welding in a state where it is brought into contact with the joint portion 24d at a predetermined surface pressure. A welding line WL between the protrusion 68a and joint portion 24d may be a straight line extending along the longitudinal direction of the battery container 2 (FIG. 7A) or an annular shape elongated in the longitudinal direction of the battery container 2 (FIG. 7B). Further, as illustrated in FIG. 7C, a plurality of welding points WP may be disposed between the protrusion 68a and joint portion 24d along the longitudinal direction of the battery container 2. In the example of FIG. 7C, the welding line WL or welding point WP is preferably disposed near a portion at each of both ends of the joint portion 24d in the longitudinal direction where the annular groove 24c is curved or formed into a circular arc shape.

As illustrated in FIG. 4A, the edge portion 68b of an opening of the diaphragm 68 at the outside of the battery container 2 is joined to the conductive plate 63.

The conductive plate 63 is a flat member having a through hole through which a connection terminal 62 penetrates and has a planar shape corresponding to the planar shape of the diaphragm 68 as illustrated in FIG. 5. As illustrated in FIG. 4A, the conductive plate 63 is disposed on the lower surface of the battery lid 3 through the insulating member 65. More specifically, the conductive plate 63 is caulked to the battery lid 3 by the connection terminal 62 extending from the positive electrode external terminal 61 and is disposed inside the battery container 2. A surface of the conductive plate 63 that faces inside the battery can 4 is a flat surface having no protrusion or the like and has an annular engagement groove 63a to be engaged with the edge portion 68b of the diaphragm 68.

The diaphragm 68 is joined to the conductive plate 63 by, for example, laser welding, resistance welding, or ultrasonic welding in a state where a flange-like part of the edge portion 68b bent outward in a radial direction of the diaphragm 68 is engaged with the engagement groove 63a of the conductive plate 63. The protrusion 68a of the diaphragm 68 is joined to the joint portion 24d of the cleavage plate 24, and the edge portion 68b is joined to the conductive plate 63, whereby the cleavage plate 24 and conductive plate 63 are electrically connected to each other through the diaphragm 68. The conductive plate 63 is connected with the connection terminal 62 extending from the positive electrode external terminal 61.

As described above, the positive electrode external terminal 61 is fixed to the upper surface of the battery lid 3 through the insulating member 64 and is disposed outside the battery container 2. The positive electrode external terminal 61 is formed into a flat plate shape extending in the longitudinal direction of the battery container 2 and is connected with the connection terminal 62 at its end portion on a center side of the battery container 2 in the longitudinal direction of the battery container 2. The connection terminal 62 is integrally formed with, for example, the positive electrode external terminal 61.

The connection terminal 62 is a cylindrical member extending along a center axis penetrating the battery lid 3. The connection terminal 62 is formed into a cylindrical shape having a through hole 62b formed along its center axis. In the connection terminal 62, an outer diameter of a leading end portion extending inside the battery container 2 is smaller than that of a base portion connected to the positive electrode external terminal 61. The connection terminal 62 extends inside the battery container 2 from the positive electrode external terminal 61 and penetrates through a through hole of the battery lid 3. The leading end portion of the connection terminal 62 penetrates through the through hole of the conductive plate 63 disposed inside the battery container 2 and is then caulked at its tip end, to form a caulking portion 62a.

With the above configuration, the connection terminal 62 integrally fixes the positive electrode external terminal 61, battery lid 3, and conductive plate 63 to each other with the insulating members 64 and 65 interposed therebetween and electrically connects the positive electrode external terminal 61 and conductive plate 63. Further, in a state where the edge portion 68b of the diaphragm 68 is joined to the conductive plate 63, a space between the diaphragm 68 and conductive plate 63 isolated from an inner space of the battery container 2 communicates with an external space of the battery container 2 through the through hole 62b of the connection terminal 62.

The positive electrode external terminal 61 is disposed on the upper surface of the battery lid 3 through the insulating member 64 and is electrically insulated from the battery lid 3. The insulating member 64 has a concave portion 64a to be engaged with the positive electrode external terminal 61 and an opening portion 64b through which the through hole of the battery lid 3 is exposed. The connection terminal 62 and battery lid 3 are electrically insulated from each other by a gasket 66. The gasket 66 is formed into a cylindrical shape and has, at its one end portion, a flange-like portion extending in a radial direction thereof. The insulating member 64 and gasket 66 are each produced by using, e.g., a resin material having an insulating property.

With the above configuration, the positive electrode collector plate 21 and positive electrode external terminal 61 are electrically connected to each other through the cleavage plate 24, diaphragm 68, conductive plate 63, and connection terminal 62. That is, a current path between the positive electrode collector plate 21 and positive electrode external terminal 61 is constituted by the cleavage plate 24, diaphragm 68, conductive plate 63 and connection terminal 62, and the current interrupting portion 60 mainly constituted by the cleavage plate 24 and diaphragm 68 is disposed in this current path. The positive electrode collector plate 21, cleavage plate 24, diaphragm 68, conductive plate 63, connection terminal 62, and positive electrode external terminal 61 are each produced by using, for example, aluminum or an aluminum alloy.

The members illustrated in FIG. 4A can be assembled in the following procedures. First, the insulating member 64 and gasket 66 are positioned and disposed on the upper surface of the battery lid 3 such that the through hole of the battery lid 3 is exposed to the opening portion 64b of the insulating member 64 and that the cylindrical portion of the gasket 66 is inserted into the through hole of the battery lid 3. Then, the connection terminal 62 is inserted through the cylindrical portion of the gasket 66 to make the connection terminal 62 penetrate through the through hole of the battery lid 3. Further, the positive electrode external terminal 61 is engaged with the concave portion of the insulating member 64.

Then, the insulating member 65 is positioned and disposed on the lower surface of the battery lid 3, and the leading end portion of the connection terminal 62 is inserted through a through hole of the insulating member 65. Further, the leading end portion of the connection terminal 62 is inserted through the through hole of the conductive plate 63 and is plastically deformed so as to be expanded in diameter, whereby the caulking portion 62a is formed. As a result, the positive electrode external terminal 61, insulating members 64 and 65, battery lid 3, gasket 66, and conductive plate 63 are integrally caulked and fixed to each other. The positive electrode external terminal 61 and conductive plate 63 are electrically connected to each other by the connection terminal 62 and electrically insulated from the battery lid 3 by the insulating members 64 and 65 and gasket 66.

Then, the edge portion 68b of the diaphragm 68 is engaged with and welded to the engagement groove 63a of the conductive plate 63, and the fixation convex portions 65a of the insulating member 65 protruded from the lower surface of the battery lid 3 are inserted into and heat-welded to the fixing holes of the base portion 22 of the positive electrode collector plate 21 and cleavage plate 24. Further, the top surface of the protrusion 68a of the diaphragm 68 is welded to the joint portion 24d of the cleavage plate 24. As a result, the positive electrode collector plate 21 is integrally fixed to the battery lid 3 through the insulating member 65 and diaphragm 68. Further, the positive electrode collector plate 21 and conductive plate 63 are electrically connected through the cleavage plate 24 and diaphragm 68, and the positive electrode collector plate 21 is electrically insulated from the battery lid 3 by the insulating member 65.

Although not illustrated, the same connection terminal as that connected to the positive electrode external terminal 61 is connected to the negative electrode external terminal 71; however, on the negative electrode side, the cleavage plate, conductive plate, and diaphragm are not disposed. On the negative electrode side, a leading end of the connection terminal extending from the negative electrode external terminal 71 is inserted through the gasket and through hole of the base portion of the negative electrode collector plate 31. Further, the leading end of the connection terminal is caulked to form a caulking portion, whereby the negative electrode external terminal 71, insulating member 74 and 75, gasket, battery lid 3, and negative electrode collector plate 31 are integrally caulked and fixed to each other. Further, the negative electrode external terminal 71 and negative electrode collector plate 31 are electrically connected to each other by the connection terminal and electrically insulated from the battery lid 3 by the insulating member and gasket.

With the above procedure, the lid assembly 10 illustrated in FIG. 2 is formed. Further, the foil exposed portions 41b and 42b at both ends of the rolled electrode group 40 in the roll axis direction are bundled and joined to the joint pieces 21a and 31a of the positive- and negative-electrode collector plates 21 and 31, respectively, whereby the power generating element 50 is formed. The power generating element 50 is inserted inside the battery can 4 through the opening portion 4a of the battery can 4, and the battery lid 3 is welded to the opening portion 4a of the battery can 4. Then, a non-aqueous electrolyte solution is injected inside the battery container 2 through the injection hole 11, and the injection plug is welded to the injection hole 11 to seal the battery container 2, whereby the rectangular secondary battery 1 illustrated in FIG. 1 is obtained.

The following describes effects of the rectangular secondary battery 1 according to the present embodiment.

As illustrated in FIG. 4A, in the rectangular secondary battery 1, the space between the diaphragm 68 and conductive plate 63 is made to communicate with an external space of the battery container 2 through the through hole 62b of the connection terminal 62. Therefore, when a pressure inside the battery container 2 is increased due to, for example, overcharge, excessive temperature rise, or breakage by an external force, a pressure applied to a surface of the diaphragm 68 that faces inside the battery container 2 becomes higher than a pressure applied to a surface thereof that faces outside the battery container 2. As a result, a stress that deforms the diaphragm 68 toward outside the battery container 2 from the inside thereof is applied to the diaphragm 68; however, the convex shape of the diaphragm 68 that protrudes inside the battery container 2 is almost kept until the pressure reaches a predetermined value.

When the internal pressure of the battery container 2 is further increased to reach a prescribed value, the diaphragm 68 is plastically deformed (for example, buckled), in a concave shape, toward outside the battery container 2. At this time, since the diaphragm 68 is joined, at the protrusion 68a of the top portion thereof, to the joint portion 24d of the cleavage plate 24, a stress in the direction toward outside the battery container 2 is applied to the joint portion 24d. Then, the stress is concentrated on the annular groove 24c surrounding the joint portion 24d, with the result that the thin portion 24b is ruptured with the annular groove 24c as a starting point. This disconnects the connection between the cleavage plate 24 and diaphragm 68 to interrupt the current path between the positive electrode collector plate 21 and conductive plate 63. As a result, the current path between the rolled electrode group 40 and positive electrode external terminal 61 is interrupted, thereby ensuring safety of the rectangular secondary battery 1. Further, the plastic deformation of the diaphragm 68 in a concave shape prevents the diaphragm 68 from contacting the cleavage plate 24 again.

Assume here that the diaphragm is formed into a flat plate shape and has a true circle shape in a plan view, as is conventionally done. In this case, in a thin type rectangular secondary battery, a diameter of the diaphragm may be restricted by a short direction dimension of the battery container 2, resulting in failure to ensure a sufficient surface area in some cases. In this case, a pressure applied to the diaphragm upon increase in the internal pressure of the battery container 2 is reduced, thus failing to rupture the thin portion 24b of the cleavage plate 24 at a prescribed internal pressure, with the result that the internal pressure of the battery container 2 may be increased to exceed a predetermined value. In order to reliably rupture the thin portion 24b when the internal pressure of the battery container 2 is increased to a predetermined value, it is necessary to reduce strength of the thin portion 24b by, for example, increasing a depth of the annular groove 24c. However, the reduction in strength of the thin portion 24b may cause the thin portion 24b to be ruptured by an external factor such as vibration or impact, resulting in malfunction of the current interrupting portion of the rectangular secondary battery 1 or in deterioration in quality of the rectangular secondary battery 1.

On the other hand, as illustrated in FIG. 8B, in the rectangular secondary battery 1 according to the present embodiment, the diaphragm 68 has a larger dimension in the longitudinal direction of the battery container 2 than in the short direction of the battery container 2 and formed into a shape elongated in the longitudinal direction of the battery container 2 in a plan view. Thus, in the present embodiment, it is possible to increase the surface area of the diaphragm 68 as needed even in the thin type rectangular secondary battery 1 by adjusting the dimension of the diaphragm 68 in the longitudinal direction of the battery container 2. This allows increase in the pressure applied to the surface of the diaphragm 68 that faces inside the battery container 2 by the internal pressure of the battery container 2, thereby applying a sufficient stress to the joint portion 24d of the cleavage plate 24 upon deformation of the diaphragm 68. Thus, for example, it is possible to increase strength of the thin portion 24b by reducing the depth of the annular groove 24c or increasing a thickness of the thin portion 24b, making it possible to prevent the thin portion 24b from being ruptured by an external factor such as vibration or impact. Thus, according to the present embodiment, there can be obtained the rectangular secondary battery 1 excellent in vibration resistance and impact resistance and capable of reliably and stably interrupting the current path when the pressure inside the battery container 4 is increased.

Further, the diaphragm 68 has a bowl shape and formed so as to protrude inside the battery container 2, so that it is possible to increase strength of the diaphragm 68 against a pressure that deforms the diaphragm 68 toward outside the battery container 2, as compared to a case where the diaphragm 68 is formed into a flat plate shape. This can prevent occurrence of such malfunction of the current interrupting portion 60 that the diaphragm 68 is deformed by a pressure lower than a predetermined internal pressure.

Further, the diaphragm 68 is joined, at the protrusion 68a of the top portion thereof, to the joint portion 24d. The diaphragm 68 has the protrusion 68a at the top portion thereof, as described above, and thereby the top portion of the diaphragm 68 is reinforced by a peripheral side wall of the protrusion 68a. This allows the top surface of the protrusion 68a and joint portion 24d to be joined to each other in a state where the top surface of the protrusion 68a is pressed against the joint portion 24d at a predetermined surface pressure.

Further, the stepped portion 68e abutting against the joint portion 24d is formed at the top surface of the protrusion 68a. With this configuration, the thin portion 24b is slightly elastically deformed toward inside the battery container 2 to bring the joint portion 24d into close contact with the stepped portion 68e at a predetermined surface pressure. By joining the top surface of the protrusion 68a and joint portion 24d to each other in a state where the top surface of the protrusion 68a is pressed against the joint portion 24d at a predetermined surface pressure, joining strength between the top surface of the protrusion 68a and joint portion 24d can be increased.

Further, the protrusion 68a of the diaphragm 68 has a shape elongated in the longitudinal direction of the battery container 2 in a plan view. This allows the planar shape of the protrusion 68a to correspond to the outer shape of the diaphragm 68, thus making it possible to sufficiently ensure, between the protrusion 68a and edge portion 68b, a portion that is comparatively easily deformed. Thus, even when the diaphragm 68 is reinforced by the protrusion 68a at the top portion thereof, it is possible to easily deform the diaphragm 68 toward outside the battery can 4 from the inside thereof when the internal pressure of the battery container 2 reaches a predetermined value.

Further, the cleavage plate 24 connected to the base portion 22 of the positive electrode collector plate 21 has the joint portion 24d and annular groove 24c formed around the joint portion 24d so as to be recessed in the thickness direction of the cleavage plate 24, and the protrusion 68a of the diaphragm 68 is joined to the joint portion 24d. Thus, upon deformation of the diaphragm 68, stress can be concentrated on the annular groove 24c of the thin portion 24b, thereby allowing the thin portion 24b to be ruptured easily and reliably with the annular groove 24c as a starting point.

If the strength of the cleavage plate 24 meets a given condition, the same effects as above can be obtained even in a case where the concave portion 24a and thin portion 24b are not formed in the cleavage plate 24, that is, even in a configuration where the cleavage plate 24 has only the joint portion 24d and annular groove 24c. Further, it is not always necessary to form the annular groove 24c when the current path between the diaphragm 68 and positive electrode collector plate 21 can be interrupted by deformation of the diaphragm 68.

Further, the protrusion 68a of the diaphragm 68 contacts the thin portion 24b at an outside of the joint portion 24d and annular groove 24c. Therefore, when the top surface of the protrusion 68a of the diaphragm 68 is pressed against the joint portion 24d for joining, the top surface of the protrusion 68a of the diaphragm 68 is supported by the thin portion 24b formed outside the joint portion 24d and annular groove 24c, thus making it possible to prevent an excessive pressure from being applied to a fragile portion at a bottom of the annular groove 24c. Further, it is possible to prevent the fragile portion around the joint portion 24d from not only being locally vibrated but also being applied with a local impact force. As a result, it is possible to suppress strength of the fragile portion around the joint portion 24d from being reduced to make it possible to prevent the fragile portion from being ruptured unintentionally. Thus, malfunction of the current interrupting portion 60 can be prevented, and at the same time, vibration resistance and impact resistance of the rectangular secondary battery 1 can be increased.

Further, the annular groove 24c is formed into an annular shape elongated in the longitudinal direction of the battery container 2. With this configuration, when the protrusion 68a of the diaphragm 68 is welded to the joint portion 24d formed inside the annular groove 24c, the welding line WL and welding point WP can be formed in a wider range along the longitudinal direction of the battery container 2, allowing increase in joining strength between the diaphragm 68 and joint portion 24d. Further, by making the shape of the annular groove 24c correspond to the shape of the protrusion 68a of the diaphragm 68 and bringing the welding line WL and welding point WP close to the annular groove 24c, the annular groove 24c can be ruptured more easily.

In a case where the depth of the annular groove 24c at a portion extending in the longitudinal direction of the battery container 2 is greater than that at the other portion, it is possible to more easily and reliably rupture the fragile portion at the bottom of the annular groove 24c when the internal pressure of the battery container 2 reaches a predetermined value. Specifically, in the example of in FIG. 7A, the depth of the annular groove 24c at the linear portion between the curved portion at both ends in the longitudinal direction of the battery container 2 is made greater than that at the curved portion. In this case, upon deformation of the diaphragm 68, high stress is applied to longitudinal direction both ends of the annular groove 24c to rupture the curved portion, followed by rupture of the linear portion. Therefore, by ensuring strength by reducing the depth of the curved portion of the annular groove 24c, it is possible to prevent the annular groove 24c from being ruptured before the internal pressure of the battery container 2 reaches a predetermined value. Further, by making the depth of the linear portion of the annular groove 24c greater than the depth of the curved portion, it is possible to easily rupture the linear portion after the internal pressure reaches a predetermined value to rupture the curved portion. Thus, the current path can be stably and reliably interrupted upon increase in the internal pressure of the battery container 2.

Further, in the diaphragm 68, at least a part adjacent to the protrusion 68a is formed into a curved surface protruding inside the battery can 4. With this configuration, as compared to a case where the part adjacent to the protrusion 68a is formed into a flat surface, strength of the part against deformation can be increased until the internal pressure of the battery container 2 reaches a predetermined value. Further, by increasing the surface area of the part adjacent to the protrusion 68a to increase stress to be applied to the joint portion 24d upon deformation of the diaphragm 68 occurring after the internal pressure of the battery container 2 reaches a predetermined value, the current path can be stably and reliably interrupted.

Further, the diaphragm 68 has the protrusion 68a, ceiling portion 68d adjacent to the protrusion 68a, and side wall portion 68c adjacent to the ceiling portion 68d, which are arranged in this order from the inside to outside of the battery container 2. The ceiling portion 68d is formed into a curved surface whose inclination relative to a surface parallel to the battery lid 3 is gentler than that of the side wall portion 68c relative to the surface parallel to the battery lid 3. Therefore, by adjusting the curvature of the ceiling portion 68d, it is possible to easily adjust a value of the internal pressure at which the diaphragm 68 is deformed, thereby allowing easy adjustment of the internal pressure value of the battery container 2 at which the current path between the positive electrode external terminal 61 and positive electrode collector plate 21 is interrupted by the current interrupting portion 60.

Further, existence of the side wall portion 68c allows a space between the conductive plate 63 and ceiling portion 68d to be ensured. The caulking portion 62a of the connection terminal 62 is housed in this space and, thereby, abutment between the diaphragm 68 and caulking portion 62a can be avoided. This allows increase in the surface area of the ceiling portion 68d. Further, the existence of the side wall portion 68c allows easy deformation of the diaphragm

68 at a connecting portion between the side wall portion 68c and ceiling portion 68d when the internal pressure of the battery container 2 reaches a predetermined value. Thus, when the internal pressure of the battery container 2 reaches a predetermined value to deform the diaphragm 68, the stress to be applied to the joint portion 24d can be increased to thereby stably and reliably interrupt the current path between the positive electrode external terminal 61 and positive electrode collector plate 21.

Further, the rectangular secondary battery 1 has the conductive plate 63 to be joined to the edge portion 68b of the diaphragm 68 and the connection terminal 62 electrically connecting the conductive plate 63 and positive electrode external terminal 61. This allows formation of a space between the conductive plate 63 and cleavage plate 24, thereby allowing the diaphragm 68 to be disposed in this space. Further, by joining the conductive plate 63 and edge portion 68b of the diaphragm 68, the internal space of the battery container 2 can be sealed by the diaphragm 68, and by making a space between the conductive plate 63 and diaphragm 68 communicate with an external space through the through hole of the connection terminal 62, the diaphragm 68 can be deformed toward outside the battery can 4 upon increase in the internal pressure of the battery container 2.

Further, the material of the cleavage plate 24 integrally formed with the positive electrode collector plate 21 is aluminum or an aluminum alloy, so that when the internal pressure of the battery container 2 is increased to exceed a predetermined value, the annular groove 24c around the joint portion 24d can be easily ruptured as compared to a case where the cleavage plate 24 is formed of a metal having a comparatively high strength, such as copper. Thus, when the internal pressure of the battery container 2 reaches a predetermined value, the current path between the positive electrode external terminal 61 and positive electrode collector plate 21 can be stably and reliably interrupted.

Further, the cleavage plate 24 is fixed to the insulating member 65 at the longitudinal direction both ends thereof and has the annular groove 24c formed between the both ends fixed to the insulating member 65. Thus, even when vibration or impact is applied to the rectangular secondary battery 1 to swing the rolled electrode group 40 fixed to the positive- and negative-electrode collector plates 21 and 31, it is possible to suppress stress from being applied to the annular groove 24c. This can prevent the fragile portion at the bottom of the annular groove 24c from being ruptured by an external factor such as vibration or impact.

Further, in a case where the diaphragm 68 has a curved shape or a circular arc shape protruding outside and not having a linear portion in the short direction of the battery container 2 in a plan view, when the internal pressure of the battery container 2 reaches a predetermined value to deform the diaphragm 68, it is possible to easily deform the diaphragm 68 having a shape protruding inside the battery container 2 into a shape protruding in the reverse direction, i.e., a shape protruding outside the battery container 2.

Further, the caulking portion 62a at the leading end of the connection terminal 62 is formed by using a tool having an outer shape larger than an outer diameter of the caulking portion 62a. Thus, when the conductive plate 63 has a structure such as a convex body on a surface thereof that faces inside the battery can 4, the structure on the conductive plate 63 interferes with the tool, which may prevent a sufficient dimension of the caulking portion 62a from being ensured. In this case, a sufficient caulking strength may not be obtained by the connection terminal 62.

On the other hand, in the rectangular secondary battery 1 according to the present embodiment, the surface of the conductive plate 63 that faces inside the battery container 2 is a flat surface having no protrusion, so that there does not occur the problem that the structure on the conductive plate 63 interferes with the tool when the leading end of the connection terminal 62 is caulked to form the caulking portion 62a. Thus, it is possible to ensure a sufficiently large dimension for the caulking portion 62a to prevent the caulking strength by the connection terminal 62 from being reduced.

As described above, according to the rectangular secondary battery 1 of the present embodiment, it is possible to increase the vibration resistance and impact resistance than before and to stably and reliably interrupt the current path upon increase in the internal pressure of the battery container 2.

Although, in the rectangular secondary battery 1 according to the present embodiment, a case has been described in which the insulating member 65, positive electrode collector plate 21, and cleavage plate 24 are integrally fixed to each other by heat welding, the positive electrode collector plate 21 and cleavage plate 24 may be joined to the insulating member 65 using screws, rivets, or an adhesive. This increases joining strength. Further, although the current interrupting mechanism is provided on the positive electrode side in the rectangular secondary battery 1 according to the present embodiment, the similar mechanism may be provided on the negative electrode side.

Further, the diaphragm 68 may have any shape other than the above-mentioned shape, as long as it is formed into a convex shape protruding inside the battery container 2 and into a shape elongated in the longitudinal direction of the battery container 2 in a plan view. Hereinafter, modifications of the diaphragm 68 will be described using FIGS. 9A and 9B, FIGS. 10A and 10B, and FIGS. 11A and 11B, which correspond to FIGS. 8A and 8B, respectively.

(First Modification of Diaphragm)

Figure 9A:
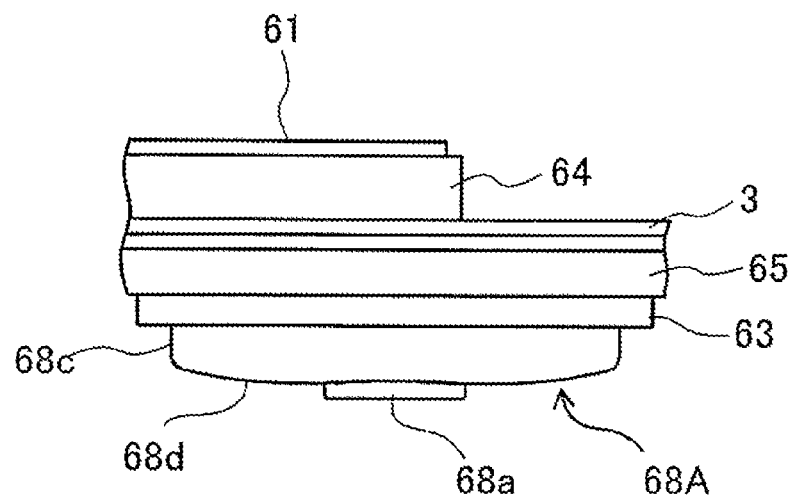
FIG. 9A is an enlarged side view illustrating a first modification of the diaphragm.
Figure 9B:
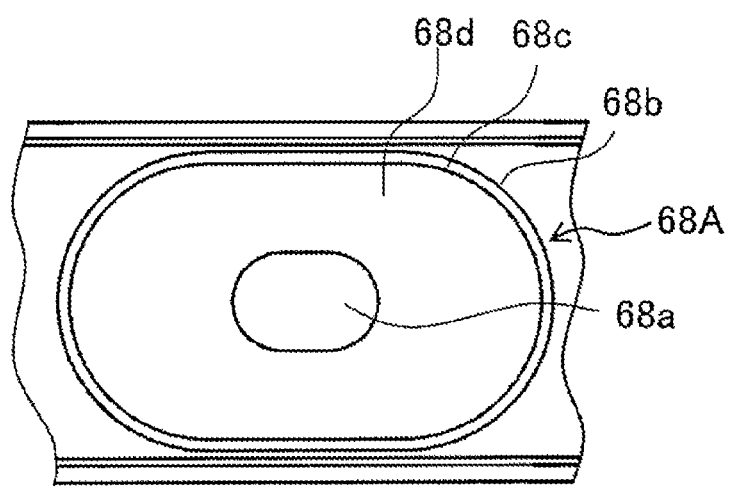
FIG. 9B is an enlarged bottom view illustrating the first modification of the diaphragm.

In the example illustrated in FIGS. 8A and 8B, the side wall portion 68c of the diaphragm 68 is inclined at an angle equal to or less than 90° relative to a surface parallel to the battery lid 3; on the other hand, in a diaphragm 68A according to a first modification illustrated in FIGS. 9A and 9B, the side wall portion 68c extends perpendicular to the surface parallel to the battery lid 3. That is, an inclination angle of the side wall portion 68c relative to the surface parallel to the battery lid 3 may be 90°.

According to the diaphragm 68A of the present modification, it is possible not only to obtain the same effects as those of the above-described diaphragm 68 but also to increase further the area of the ceiling portion 68d while avoiding abutment between the side wall portion 68c and caulking portion 62a. Thus, when the internal pressure of the battery container 2 is increased to exceed a predetermined value to deform the diaphragm 68A, the fragile portion at the bottom of the annular groove 24c around the joint portion 24d is easily ruptured, thereby making it possible to stably and reliably interrupt the current path.

(Second Modification of Diaphragm)

Figure 10A:
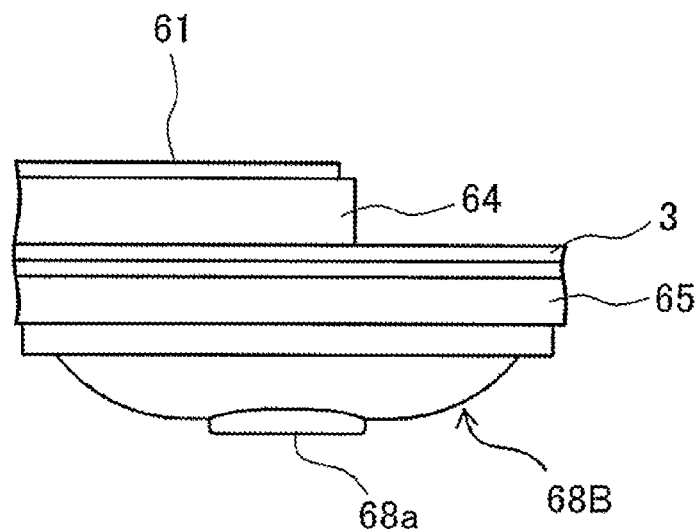
FIG. 10A is an enlarged side view illustrating a second modification of the diaphragm.
Figure 10B:
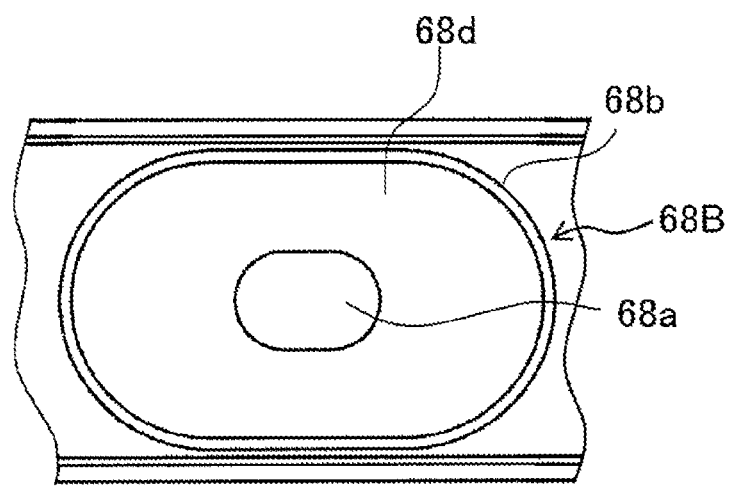
FIG. 10B is an enlarged bottom view illustrating the second modification of the diaphragm.

A diaphragm 68B according to a second modification illustrated in FIGS. 10A and 10B does not have the side wall portion 68c between the edge portion 68b and protrusion 68a and is formed into a bowl shape having a smooth curved surface continuing from the edge portion 68b to protrusion 68a. Thus, it is possible not only to obtain the same effects as those of the above-described diaphragm 68 illustrated in FIGS. 8A and 8B but also to reduce a dimension of the diaphragm 68B in the direction perpendicular to the battery lid 3.

(Third Modification of Diaphragm)

Figure 11A:
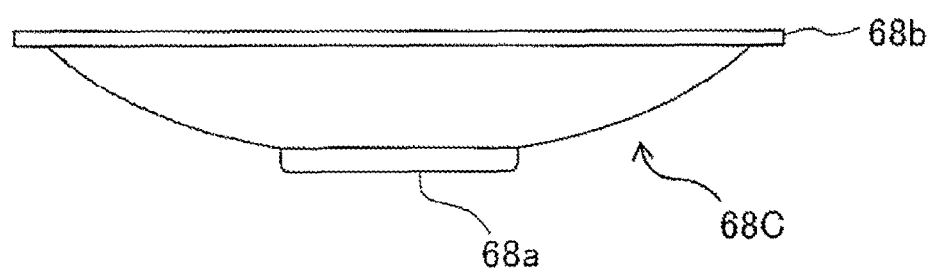
FIG. 11A is an enlarged side view illustrating a third modification of the diaphragm.
Figure 11B:
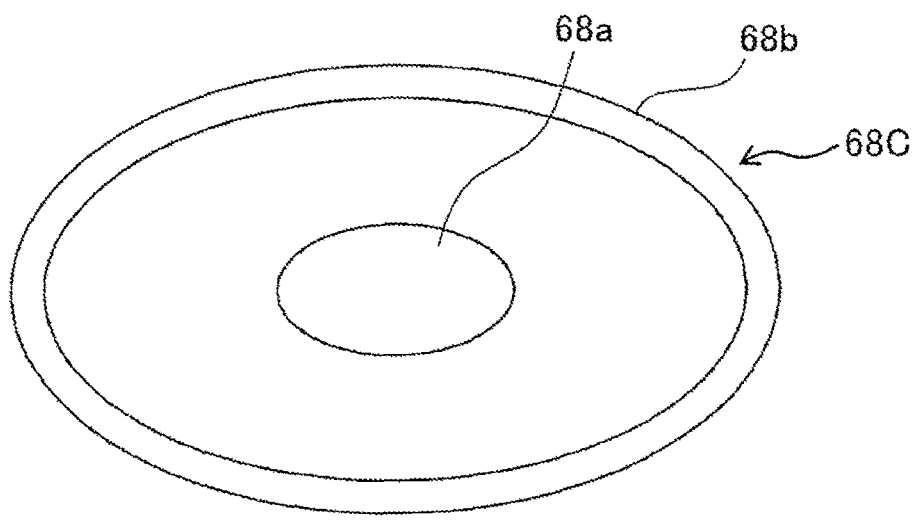
FIG. 11B is an enlarged bottom view illustrating the third modification of the diaphragm.

A diaphragm 68C according to a third modification illustrated in FIGS. 11A and 11B is formed into an ellipse having no linear portion in a plan view. As described above, the planar shape of the diaphragm 68C is formed only with a smooth curved line, so that when the internal pressure of the battery container 2 reaches a predetermined value to deform the diaphragm 68C into a shape protruding in the reverse direction, there does not occur a sharp change in the curvature in the connecting portion between the liner and curved portions, making it easy to deform the diaphragm 68C. Thus, upon deformation of the diaphragm 68C, the fragile portion at the bottom of the annular groove 24c around the joint portion 24d is easily ruptured, thereby making it possible to stably and reliably interrupt the current path.

While the preferred embodiments of the present invention have been described, the present invention is not limited to the above-described embodiments, but includes various modifications. The above embodiments have been described in detail in order to facilitate understanding of the present invention, and the embodiments are not necessarily limited to a configuration having all constituent elements described.

REFERENCE SIGNS LIST

1 . . . rectangular secondary battery, 2 . . . battery container, 21 . . . positive electrode collector plate (collector plate), 24c . . . annular groove, 24d . . . joint portion, 40 . . . rolled electrode group, 41 . . . positive electrode, 61 . . . positive electrode external terminal (external terminal), 62 . . . connection terminal, 62a . . . caulking portion, 63 . . . conductive plate, 68 . . . diaphragm, 68a . . . protrusion, 68b . . . edge portion, 68c . . . side wall portion, 68d . . . ceiling portion

The invention claimed is:

1. A rectangular secondary battery comprising:
a current interrupting portion disposed in a current path between a collector plate connected to a rolled electrode group and an external terminal and configured to interrupt the current path when an internal pressure of a battery container is increased, wherein
the current interrupting portion has a diaphragm that is formed into a convex shape protruding inside the battery container and into a planar shape elongated in a longitudinal direction of the battery container the diaphragm whose top portion is electrically connected to the collector plate and whose edge portion is electrically connected to the external terminal, wherein
a protrusion from the top portion is protruding inside the battery container and the protrusion has a shape extending in the longitudinal direction in a plan view,
a cleavage plate electrically connected to the collector plate, wherein
the cleavage plate has a joint portion joined with the protrusion of the diaphragm and an annular groove formed around the joint portion, and
at least a part of the protrusion contacts the cleavage plate at an outside of the annular groove.

2. The rectangular secondary battery according to claim 1, wherein
the annular groove is formed into an annular shape elongated in the longitudinal direction, and
a depth of the annular groove at a portion extending in the longitudinal direction is greater than that at other portion.

3. The rectangular secondary battery according to claim 1, wherein
at least a part of the diaphragm adjacent to the protrusion is formed into a curved surface protruding inside the battery container.

4. The rectangular secondary battery according to claim 3, wherein
the diaphragm has the protrusion, a ceiling portion adjacent to the protrusion, and a side wall portion adjacent to the ceiling portion, which are arranged in this order from the inside to outside of the battery container, and
the ceiling portion is formed into a curved surface whose inclination is gentler than that of the side wall portion.

5. The rectangular secondary battery according to claim 4, comprising:
a conductive plate joined to an edge portion of the diaphragm; and
a connection terminal connecting the conductive plate and external terminal, wherein
the connection terminal extends from the external terminal and penetrates through the conductive plate and has a caulking portion at a leading end thereof on the conductive plate side and a through hole through which a space between the diaphragm and conductive plate communicates with an external space of the battery container.

6. The rectangular secondary battery according to claim 1, wherein a material of the cleavage plate is aluminum or an aluminum alloy.

* * * * *